United States Patent [19]

Appelbaum et al.

[11] Patent Number: 5,259,169
[45] Date of Patent: Nov. 9, 1993

[54] PACKAGING MACHINE

[76] Inventors: Paul Appelbaum, 34591 Camino Capistrano, Capistrano Beach, Calif. 92718; Duane L. Clegg, 950 Flint Way, Broomfield, Colo. 80020

[21] Appl. No.: 825,636

[22] Filed: Jan. 24, 1992

[51] Int. Cl.$^5$ ............................................. B65B 51/10
[52] U.S. Cl. .................................. 53/373.8; 53/374.8; 156/379.8
[58] Field of Search ............... 156/273.7, 275.1, 275.3, 156/275.5, 379.8; 53/471, 478, 281, 299, 300, 133.4, 139.2, 329.3, 373.3, 374.8, 373.8, DIG. 2

[56] References Cited

U.S. PATENT DOCUMENTS

| | | | |
|---|---|---|---|
| 3,192,091 | 6/1965 | Hey et al. | 53/478 X |
| 3,792,567 | 2/1974 | Balcome | 53/282 X |
| 4,072,552 | 2/1978 | Ewing | 53/282 X |
| 4,437,293 | 3/1984 | Sanborn, Jr. | 53/133.4 X |
| 4,495,749 | 1/1985 | Faller | 53/471 |
| 4,736,568 | 4/1988 | Shaw et al. | 53/297 |
| 4,991,375 | 2/1991 | Raque et al. | 53/374.8 X |

Primary Examiner—John Sipos
Assistant Examiner—Daniel Moon
Attorney, Agent, or Firm—Charles C. Corbin

[57] ABSTRACT

Disclosed is a method and apparatus that uses UV energy to seal articles in plastic clamshell packages, and which employs a portable tray that can hold a plurality of packages to be sealed, each package having a bottom piece shaped to hold an article and a top piece with a periphery which nests within the periphery of a bottom piece supplied with UV curable adhesive. The tray is mountable on a loading platform which is operative to position the tray within an enclosure below a raised pressure plate having UV transparent portions, and below a UV light source and a shutter mechanism for controlling exposure of the transparent portions of the pressure plate by the UV source. When a loaded tray is positioned below the plate it is lowerable to press top and bottom clamshell pieces together, and the shutter is opened and closed to expose the adhesive for a predetermined period of time as pressure is maintained, after which the pressure plate is returned to its raised position and the tray of cured packages removed from the enclosure.

10 Claims, 3 Drawing Sheets

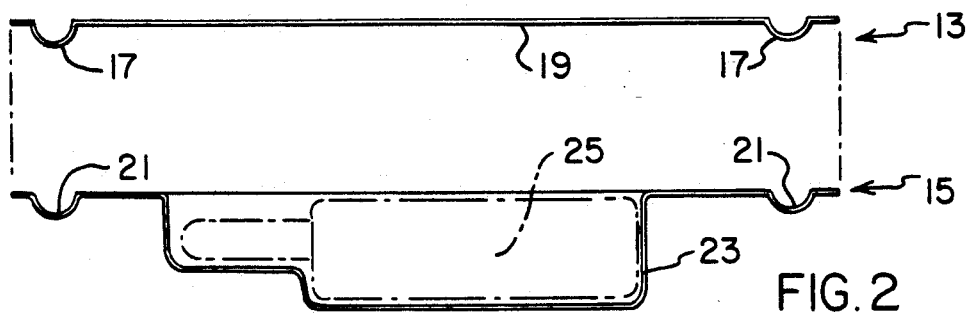
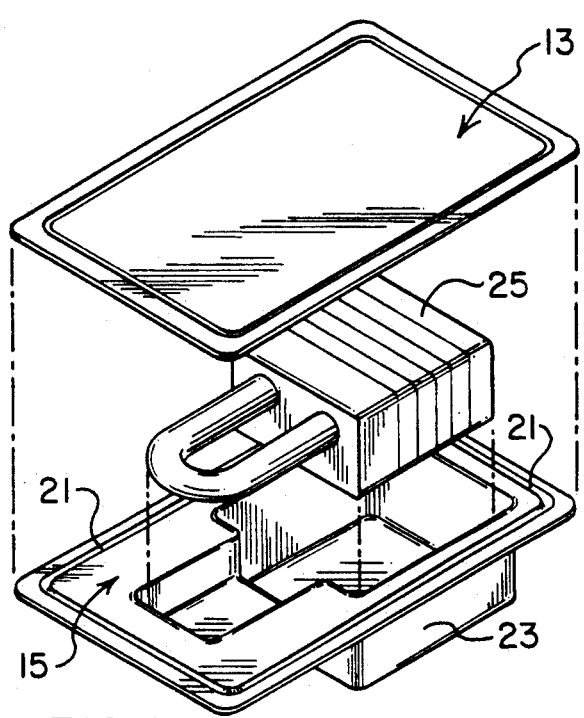
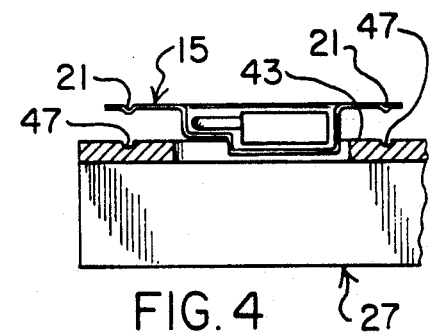
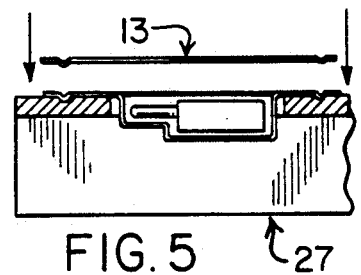
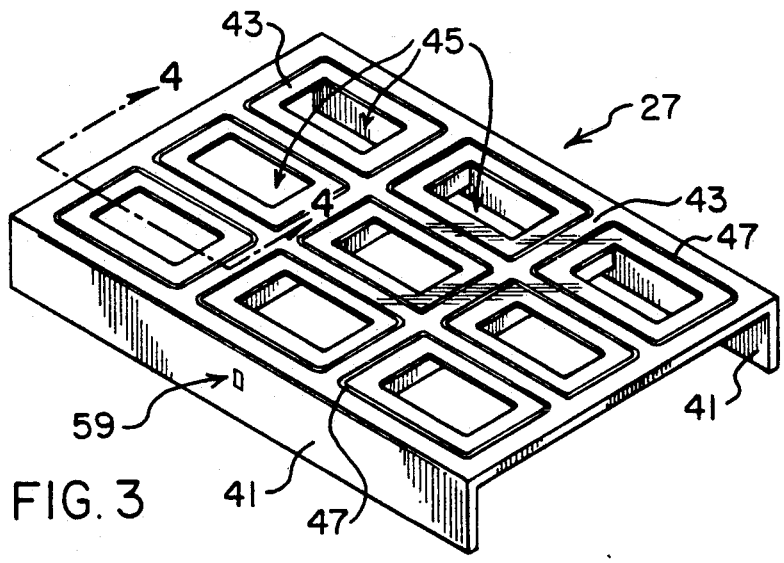

PACKAGING MACHINE

BACKGROUND

1. Field of the Invention

This invention relates to method and apparatus employing UV energy for sealing articles in plastic packages, each package comprising a first piece with a peripherally extending groove and a second plastic piece with a peripheral portion designed to nest within the first piece.

2. Description of the Prior Art

One popular method for packaging articles in transparent plastic involves the use of the blister package, the package comprising a transparent blister piece and a backing sheet of foil or paper which is sealed to the blister piece after the blister piece is filled with the article to be packaged. To a large extent the task of sealing blister packages was met by the use of heat curable adhesives and sealing equipment designed for thermobonding such packages. An example of thermo sealing packaging devices is shown in U.S. Pat. No. 3,686,059. These processes, all of which involved the application of heat, were an improvement over earlier developments, yet they also carried many drawbacks which has led to the development of packaging machines for blister packages which utilize ultraviolet curable adhesive and the manipulation of UV radiation.

The state of modern packaging design has now evolved beyond the blister pack to the clamshell package which offers advantages including consumer appeal, recyclability and versatility. The so-called clamshell package is constructed differently to the blister package and uses two clear plastic shells that are shaped to nest with each other. In response to the need for means for sealing clamshell packages, systems have been developed using ultrasonic techniques, radio frequency (r.f.) energy, and heat curable glue. These systems all carry drawbacks, however. In addition, the known U.V. systems for the blister pack design are clearly not adapted for the differently structured clamshell packages. It is further noted that the available packaging systems appear to be primarily designed to address mass production requirements and entail relatively high acquisition and operating expenses. The available equipment has not met the requirements of many relatively small entities for an effective yet affordable way to seal clamshell packages.

SUMMARY OF THE INVENTION

In view of the aforestated drawbacks and limitations of the prior art it is a general object of the present invention to provide effective and efficient method and apparatus for sealing clamshell packages.

Another object of the present invention is to provide simple and reliable means for sealing clamshell packages.

Yet another object of the present invention is to make clamshell packaging equipment more affordable.

These and other objects and advantages are provided by the present invention involving a method and apparatus that uses UV energy for sealing articles in clamshell packages, where each package comprises a first clear plastic piece shaped to receive an article to be packaged and having a peripherally extending groove, and a second clear plastic piece for covering the first piece and with a peripherally extending rib that will nest into the groove of the first piece. A plurality of the first pieces are removably mountable on a portable tray which vertically supports the peripheral portions of these first pieces. After articles to be packaged are placed within the supported first pieces quantities of liquid UV curable adhesive are placed in selected portions of the peripheral grooves of the first pieces. Each of these first pieces is then nested by a second piece and the tray of unsealed packages placed upon a loading platform which operates to position the tray within an enclosure below a pressure plate having UV transparent portions and which is lowerable to press and hold the package pieces together causing the deposited adhesive to coat mutually engaging portions of the pieces. Within the upper part of the housing a UV source constantly directs UV radiation downwardly towards the pressure plate, however the invention includes shutter mechanism above the pressure plate which is operable to control exposure of the pressure plate and its UV transparent portions. As pressure is maintained, the UV adhesive coated portions are exposed to a predetermined dosage of UV radiation for a period of time sufficient to cure the adhesive and to bind the first and second pieces together to form a plurality of sealed packages. The pressure is then removed and the tray of sealed packages is withdrawn from the housing.

The accompanying drawings which form a part of the specifications illustrate a preferred embodiment of the invention and together with the description serve to explain the principles of the invention.

BRIEF DESCRIPTION OF THE DRAWINGS

FIG. 1 is a perspective view showing the components of a clamshell package, and an article to be packaged;

FIG. 2 is a sectional view taken along a line through components of a clamshell package;

FIG. 3 is a view in perspective of the package support tray component of the invention;

FIG. 4 is a sectional view taken along line 4—4 of FIG. 3, and illustrating placement of a clamshell bottom piece;

FIG. 5 is a view similar to FIG. 4, and illustrating placement of a clamshell top piece;

DETAILED DESCRIPTION OF THE INVENTION

Figure 6:
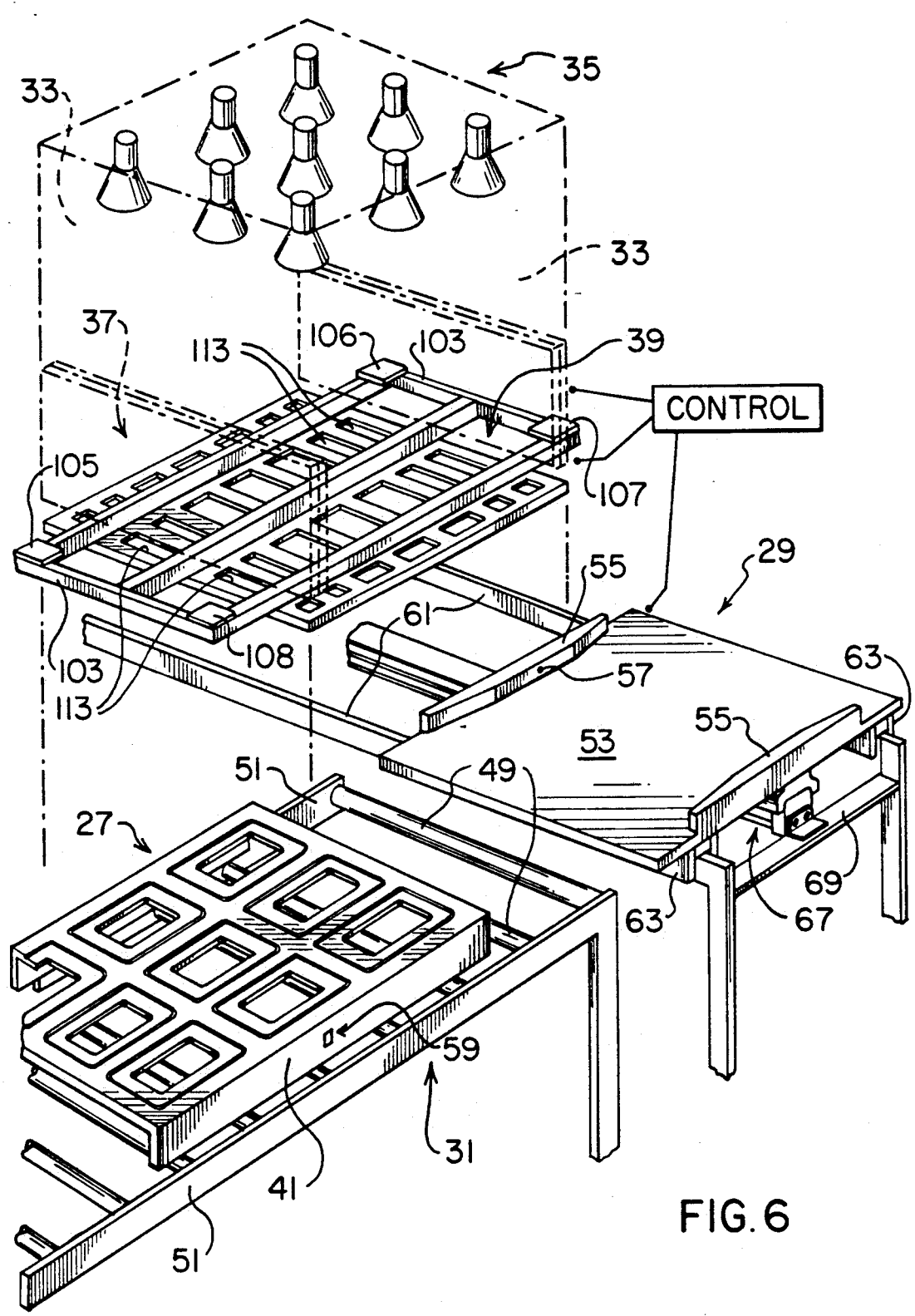
FIG. 6 is a perspective diagrammetrical view illustrating apparatus for sealing clamshell packages according to the present invention.

Referring now to the drawings, FIGS. 1 and 2 illustrate a clamshell package of the type which can be advantageously sealed using apparatus and method according to the present invention. The clamshell components include a top piece 13 and bottom piece 15 fabricated of clear plastic material such as polyvinylchloride (PVC) or other suitable polymeric material. The top piece 13 is characterized by a peripherally extending rib 17 which projects downwardly from the flat portion 19. The bottom piece 15 has a peripherally extending groove 21 which is configured to snugly receive the rib 17 of the top piece 13 when the two pieces are nested together in a manner to be described. Bottom piece 15 is also characterized by the shaped portion 23 which provides a cavity that is designed to receive the article to be packaged such as the padlock 25 illustrated here. After an article 25 is placed within bottom piece 15, the top piece 13 may be engaged over and nested with bottom piece 15. The apparatus of the present invention is designed to seal such a package with the aid of an adhesive that is curable upon exposure to ultraviolet light.

The main components of a preferred embodiment of the subject invention is shown in FIG. 6 to include at least one package support tray 27, a loading assembly 29, a roller conveyor 31 for delivering a support tray 27 to the loading assembly 29, and a housing 33 which encloses an ultraviolet light source 35, a shutter mechanism 37 and a pressure plate 39. Not shown in FIG. 6 is an air-powered system for operating the loading assembly, pressure plate and shutter mechanism, and the sequential control system for same. These components will be described hereinafter.

Referring now to FIG. 3 a package support tray 27 according to the invention is seen to comprise an aluminum or lightweight alloy structure with sidewalls 41 and a horizontal top wall 43 containing an array of openings 45. The openings 45 are designed to receive the shaped portion 23 of a clamshell lower piece 15, and the peripheral portion of each opening 45 is provided with a groove 47, shown in FIG. 4, for snugly receiving the lower side of the peripheral groove 21 with the flat upper surface of the top wall 43 adapted to engage the flat underside of piece 15 to provide vertical support therefor. It will be appreciated that the support tray 27 may be provided with any number of openings as determined by the size of the package to be sealed. The midportion of the outside of each tray wall 41 is provided with a depression 59 which is to be used for centering a tray on the platform of the loading mechanism 29 in a manner that will be described hereinafter.

The conveyor 31 is a conventional device including a generally horizontal bed of free-turning rollers 49 mounted to side rails 51 and supported above the work place floor at an elevation which holds a support tray 27 at an ergonomically suitable height. The insides of side rails 51 will help guide the longitudinal movement of a tray on the conveyor 31.

FIG. 6 shows the loading mechanism 29 in its initial preload position with the platform 53 held adjacent an opening (not shown) in the front wall of housing 33. Note that the loading platform 53 has a pair of spaced-apart brackets 55 which will serve to hold a support tray 27 in a desired centered alignment upon table 53. The spacing between brackets 55 is just slightly wider than the width of tray 27 and to ensure proper centering a resiliently depressible projecting ball detent 57 is mounted in each of the brackets 55 for releasably engaging the depressions 59 in the tray.

Figure 7:
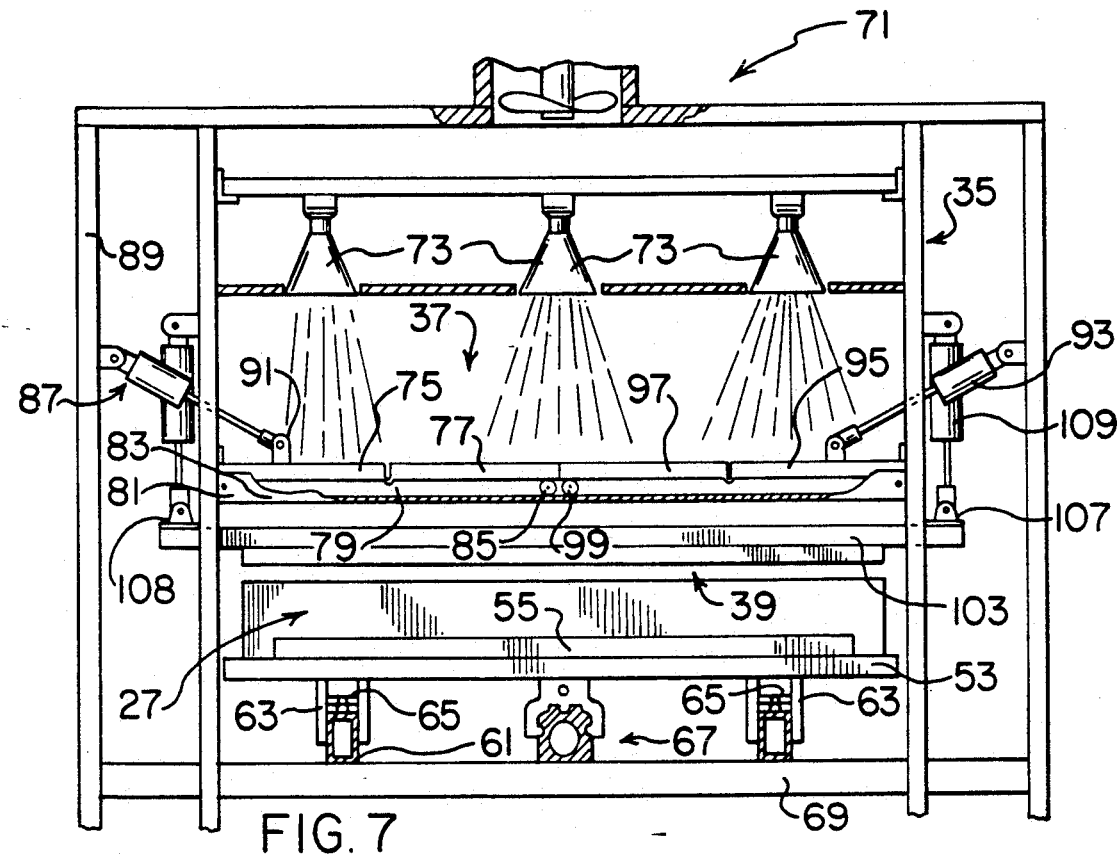
FIG. 7 is a partial sectional front elevational view, with parts broken away, illustrating the operation of clamshell packaging apparatus according to the present invention.

FIGS. 6 and 7 show that loading assembly 29 further includes a pair of spaced-apart guide rails 61. FIG. 7 further shows that the underside of platform 53 is equipped with a pair of clevises 63 which mount metallic rollers 65 that rollingly engage the tops of the rails 61 to guide horizontal movement of platform 53. The loading mechanism further features an air-powered actuator 67 which is attached to the bottom of platform 53 and to frame members 69 and which provides additional vertical support for platform 53. The preferred actuator 67 is of the type that features a rodless band-type cylinder, and has a throw that will carry the platform 53 from its initial position shown in FIG. 6 to a loaded position in which it lies completely within housing 33. One suitable band-type cylinder mechanism is sold under the trademark Tol-O-Matic and is available from Tol-O-Matic, Inc. of Minneapolis, Minn.

The actuator 67 and other power cylinders employed in the instant packaging apparatus are connected to a compressed air source via control valves (not shown) that are parts of a pneumatic sequential control system whose function will be described in greater detail hereinafter. There is a limit switch, which is suitably mounted within the housing 33 and aligned to be tripped by a platform-mounted tray when that tray has been fully inserted within the housing. This tray-loaded limit switch and other limit switches used in the instant packaging machine, are components of the pneumatic sequential control system, and generate pneumatic input signals to the system controller.

Given the sequence of air powered operations, to be described, which the apparatus of the invention must undergo to carry out the method of the invention, it will be appreciated by those with ordinary skill in the art how a pneumatic sequential control system may be employed to this end. One control system which is particularly suited to the task is available as the Polylog Sequential Control System of Watts FluidAir, of Kittery, Me.

The housing 33 has a conventional support structure of metallic frame members and sheet metal side, front, top and back walls assembled in a manner which is designed to provide an enclosure which confines ultraviolet light provided by a UV light source 35, to be described. FIG. 7 shows that the top housing wall is equipped with an exhaust vent 71 which is useful for dissipating heat generated by the light source, and the front wall of the housing has an opening that is of the minimal size for admitting passage of the loading platform 53 and a supported tray 27. The UV light source 35 comprises an array of downwardly facing UV lamps 73 that are mounted to horizontal inner frame support members. It will be appreciated that those experienced in the field of UV irradiation that the spacing, intensity, and power of the lamps will be selected to deliver UV energy in a manner best suited for adhesive curing within the arrangement of the apparatus herein being described.

Figure 8:
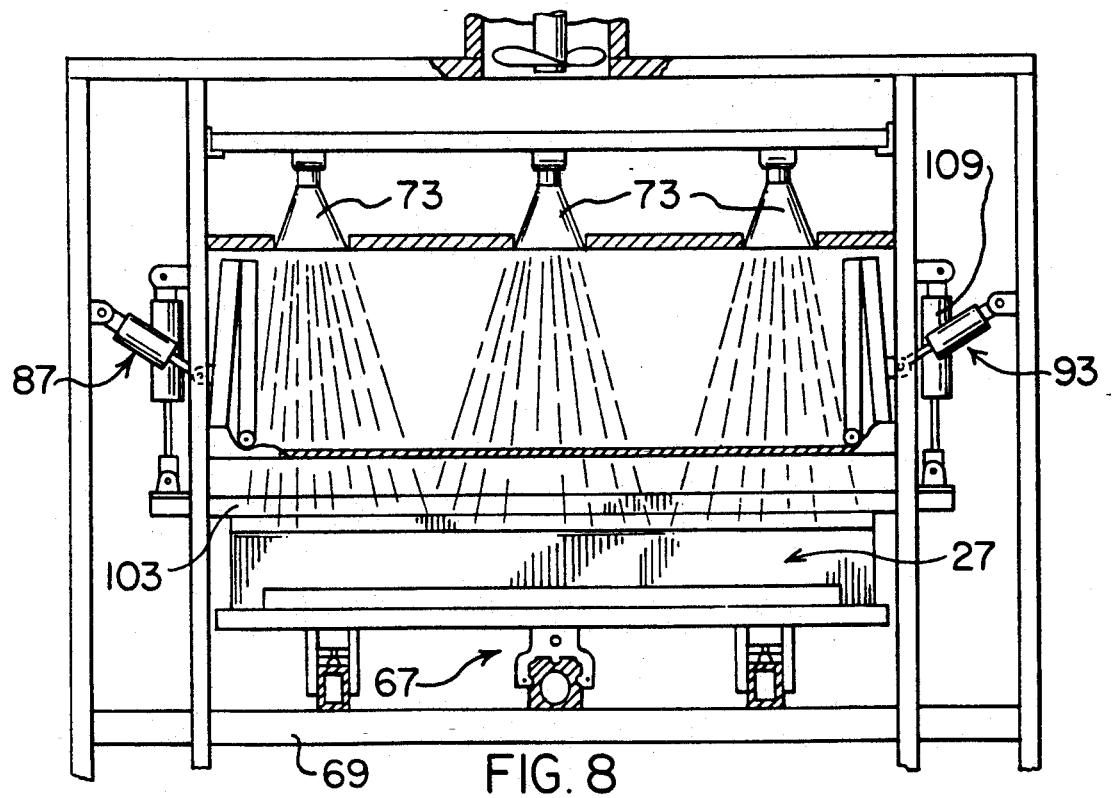
FIG. 8 is a view similar to FIG. 7.

Disposed below lamps 73 and shown in FIGS. 7 and 8 is the shutter mechanism 37 which includes a first set of folding panels 75 and 77 which have a connecting hinge at 79 along which the panels overlap to prevent any UV-passing gaps. The outer end of panel 75 is pivotally mounted about a horizontal axle 81 that is affixed to the front support member 83. The inner end of panel 77 is rollingly supported by a wheel 85. The member 83 has an L-shaped cross-sectional configuration and provides a horizontal surface on which the shutter wheel 85 may run.

An air-powered actuator 87 has its cylinder connected to a vertical wall 89 and its rod end is pivotally connected to the upper part of arm 91 affixed to panel 75, as FIG. 7 illustrates.

On the other side of the apparatus illustrated in FIG. 7 is found a second air-powered actuator 93, identical to actuator 87, and which is operatively connected to a second set of panels 95 and 97. Note the inner end of panel 97 is equipped with free-turning wheel 99. The front end of the shutter panels are shown here, however, it should be appreciated that the rear sides of panels 77 and 97 are also each equipped with a wheel identical to wheels 85 and 99. Note that there are overlapping inner edge portions which prevent a gap between panels when they are deployed in the position shown in FIG. 7. Actuators 87 and 93 are pneumatically connected in parallel and are simultaneously operable to move the panels of the shutter mechanism 37 from the closed position illustrated in FIG. 7 to the open position illustrated in FIG. 8. A reversal of air to actuators 87 and 93 will return the shutter panels to the position illustrated in FIG. 7. The air lines to actuators 87 and 93 are connected to an air-powered air control valve. A limit switch, not shown, is suitably mounted within the housing so as to be responsive to the full open position of the shutter panels, and will send a pneumatic input signal to the same control valve that is linked to the pallet-loaded limit switch. This shutter-open limit switch is also connected to a conventional adjustable timer unit within the control system so as to be operative to start the timer when the shutter panels are fully opened, and when the condition of a fully loaded tray is sensed.

Supported just below the shutter mechanism 37 is the pressure plate 39 which is preferably a flat-bottomed plate which is attached to a support frame 103 which is in turn supported at its four corners 105, 106, 107 and 108. Each of these corner portions are connected to the vertically inclined shaft of an air-powered actuator. For example, FIG. 7 illustrates the connection at 107 and 108. The actuator 109, like the three other actuators operating the pressure plate 39, has a vertically aligned cylinder that is affixed at its upper and lower ends to a vertical wall of the housing frame. The four actuators supporting the pressure plate are connected in parallel and to a control valve, and are operative in unison to move pressure plate 39 from a raised position to a lowered position, in which lowered position it will be held for a period of time as determined by the above-mentioned timer unit. There are two limit switches suitably positioned for pneumatic signalling when the pressure plate is in its lowered position and when it is in its raised position. Note that the pressure plate 39 features several apertures 113 which will be seen to be arranged to pass UV light in a manner desired to effect sealing and curing of clamshell packages when the apparatus is operated in a manner to be described. When platform 53 holding a tray 27 is loaded within the housing 33 the lower surface of the raised pressure plate 39 will be spaced a short distance from the top of tray 27.

Turning now to FIGS. 4 and 5 it is illustrated how a tray 27 is to be loaded with clamshell packages. FIG. 4 illustrates the first step by which apertures 43 of tray 27 15 are loaded with clamshell bottoms 15, each holding an article to be packaged. Suitable UV curing adhesives are available under the Light-Weld trademark of Dymax Engineering Adhesives of Torrington, Conn. Next, quantities of a UV curable adhesive are placed along portions of the groove 21. Then, as FIG. 5 illustrates, top clamshell pieces 13 are placed into nesting relationship with bottom pieces 15. A tray 27 holding packages to be sealed, may then be rolled on conveyor 31 towards engagement with the loading platform 53 which is in its initial position.

Once the tray is centered upon table 53 in the manner aforedescribed the next steps in the package sealing operation may commence. The operating apparatus has the UV light source constantly energized and the shutter mechanism 37 is initially held in its closed position, blocking UV exposure of the underlying pressure plate 39 which is held in its raised position. A package sealing cycle is begun when the actuator 67 is operated to move the platform 53 and a full tray 27 from its initial position to its load position below the pressure plate 39. Having sensed this positioning via the tray-loaded limit switch, the sequential control system will then activate the valve controlling the air-powered actuators for the pressure plate to move the plate downwardly towards engagement with the top of tray 27 and the packages supported thereon, pressing the rib 17 of each upper piece 13 into the groove 21 of each lower piece, which causes the liquid adhesive therein to spread over mutually engaging surfaces. This is illustrated in FIG. 7. When the pressure plate is thusly pressed against the package tops, the UV-passing apertures of the pressure plate will lie above areas containing the UV curable adhesives. The downward stroke of the pressure plate signals this condition to the control system via the plate-down limit switch and then the valve controlling the operation of actuators 87 and 93 is activated to open shutter mechanism 37 in the manner described above. With the shutter panels held folded open as illustrated in FIG. 8 the top of the pressure plate will be exposed to UV radiation which passes through the transparent portions to cure the adhesive in the exposed portions of the packages. The sequential control system will hold the shutter mechanism open for a preset short period of time, sufficient to cure the adhesive. After the conclusion of the exposure period, actuators 87 and 93 are operated automatically to close the shutter mechanism 37 once again. Next, the operation of the pressure plate is reversed to raise the plate off the sealed packages. The actuator 67 is then operated to move table 53, with tray 27, out of the housing and into its initial position. The tray 27 may then be moved off table 53 and to a work station where the newly sealed packages are removed.

A preferred embodiment has been described, and it should be appreciated by those with ordinary skill in the art, that within the scope of the invention various changes may be made. Thus it is aimed to cover all changes as fall within the true scope and spirit of the invention.

What is claimed is:

1. Apparatus for sealing articles in plastic clamshell packages, each package comprising a first piece having a peripheral portion and a groove extending along its peripheral portion, and a second piece adapted to cover said first piece and having a peripherally extending rib which will nest within the groove of said first piece, said apparatus comprising:
   a) a portable tray for removably mounting a plurality of said clamshell packages in a generally horizontal plane and vertically supporting said peripheral portions of said first pieces;
   b) a housing enclosure having walls that confine UV radiation and including a front wall with a loading port in a lower portion thereof;
   c) a pressure plate mounted within said enclosure at a higher elevation than said loading port and having a horizontally disposed lower surface and a top surface and adapted to move from a raised position to a lowered position, and said plate having UV transparent portions therein;
   d) loading means for removably mounting said tray and for moving it from a position exterior of said enclosure through said loading port to an interior position within said enclosure where said tray is aligned below said lower surface of said pressure plate in its raised position;

e) a UV radiation source mounted in an upper portion of said enclosure and adapted to direct UV radiation downwardly;

f) shutter means mounted below said UV source and above said pressure plate, said shutter means having a deployed position in which it covers the top surface of said pressure plate to block said UV radiation, and having an open position in which it uncovers the top surface of said plate; and g) means for controlling the operation of said loading means, pressure plate and shutter means, whereby when said tray holding a plurality of said clamshell packages in which UV-curable adhesive is contained in the grooves of said first pieces, is moved by said loading means to said position below said plate, said plate is moved to its lowered position so as to press the ribs of said second pieces into the grooves of said first pieces, said lowered position being maintained as said shutter is moved from its deployed to its open position and held therein for a predetermined time period to allow said UV radiation to pass through said plate transparent portions and cure said adhesive, after which period said shutter is returned to its deployed position, after which said pressure plate is raised and said loading means returns said tray to said exterior position.

2. Apparatus as defined in claim 1 wherein said tray has an upper surface with a plurality of openings for receiving said first pieces and shaped recesses around the periphery of said openings for receiving and supporting the peripheral grooves of said first pieces.

3. Apparatus as defined in claim 2 wherein said plate transparent portions comprise openings in said pressure plate.

4. Apparatus as defined in claim 2 wherein said shutter means includes foldable UV-impermeable panels.

5. Apparatus as defined in claim 4 including a first pair of hinged panels and a second pair of hinged panels, said panels adapted to lie in the same generally horizontal plane when said shutter means is in its deployed position, and each said pair being foldable to provide said open position of said shutter means.

6. Apparatus as defined in claim 1 wherein said loading means includes a platform mounted for movement from a position exterior of said enclosure to a position within said enclosure, said platform having an upper surface adapted to receive a tray that is moved laterally into engagement with said surface, and for releasably holding said tray in a centered position upon said platform surface.

7. Apparatus as defined in claim 6 wherein said loading means includes horizontally extending rails for supporting and guiding said platform in horizontal movement.

8. Apparatus as defined in claim 7 wherein said platform has roller means for mounting said platform on said rails.

9. Apparatus as defined in claim 6 wherein said platform upper surface is adapted to receive a tray that is moved in a direction at about 90° to the direction in which said platform is moved from its exterior position to its position within said enclosure.

10. Apparatus as defined in claim 9 including roller conveyor means for feeding said tray laterally into engagement with said platform upper surface.

* * * * *